Patented May 12, 1931

1,804,538

UNITED STATES PATENT OFFICE

WALTER MIEG, OF VOHWINKEL, NEAR ELBERFELD, GERMANY, ASSIGNOR TO GENERAL ANILINE WORKS, INC., OF NEW YORK, N. Y., A CORPORATION OF DELAWARE

VAT DYESTUFFS

No Drawing. Application filed October 27, 1927, Serial No. 229,274, and in Germany November 4, 1926.

The present invention concerns new vat dyestuffs of the anthraquinone series of the probable formula:

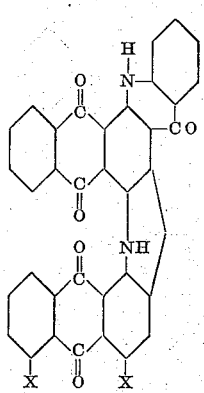

wherein X stands for hydrogen or an acylamino group, but at least one X being an acylamino group and a process for their production. They are obtained by causing sulfuric acid to act at a low temperature on dianthraquinonylamines, containing at least one acridone ring and in addition at least one acylamino group or on the derivatives and substitution products of such bodies and oxidizing the resulting condensation products, whenever necessary.

In accordance with the invention dianthraquinonylamines of the kind indicated, as for example containing at least one acridone ring in the 3:4-position are converted into differently colored compounds possessing valuable dyeing properties by prolonged heating of the respective solutions in sulfuric acid to about 30 to 40° C. The action is similar to that described in U. S. Patent 996,109. It is possible to proceed also by subjecting the substances in question to short treatment with sulfuric acid at a still lower temperature followed by oxidation of the intermediate product thus obtained. Compare U. S. patent application Ser. No. 119,197. Without further investigation with the view of establishing the constitution it is not possible to state definitely what has happened, but it appears probable that carbazole ring formation has taken place.

The new compounds are generally dark powders soluble with difficulty in organic solvents of a high boiling point e. g. nitrobenzene or aniline with an olive to blue coloration. They are valuable vat dyestuffs possessing very good fastness properties.

The following example will illustrate my invention:—

*Example:* 10 parts by weight of the dianthraquinonylamine derivative, obtained by the condensation of one molecule of 4-amino-1:2-anthraquinone acridone with one molecule of 1-benzoylamino-5-chloro-anthraquinone are dissolved in 100 parts by weight of concentrated sulfuric acid at about 15 to 20° C. The solution which is orange colored at first very quickly becomes an olive tinged brown. On stirring the solution into water, a grass-green precipitate is obtained, which becomes olive brown on the addition of about 5 parts by weight of sodium nitrite. By heating to about 60° C. a dyestuff is obtained, having most probably the formula:

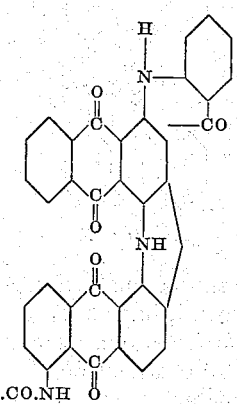

being a dark powder which forms a yellow-brown vat, dissolving in sulfuric acid with a deep blue coloration and dyeing fast olive tinged brown shades on cotton, while the starting material vatted in the form of a powder dyes cotton a greenish-grey color.

By replacing in the above example 1-benzoyl-amino-5-chloro-anthraquinone by 1-benzol-amino-4-chloro-anthraquinone, a reddish-grey vat dyestuff which forms a yellow-brown vat is obtained in a similar manner from the starting material which dyes greyish green shades.

I claim:

1. As a new product a vat dyestuff having most probably the formula:

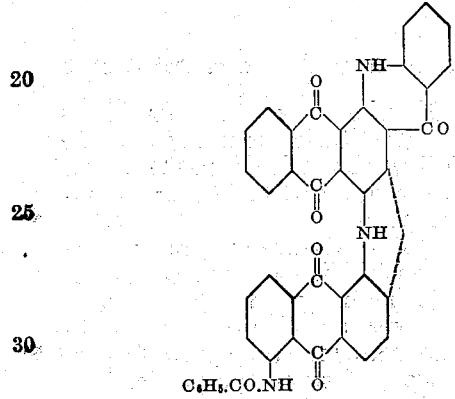

being a dark powder soluble in concentrated sulfuric acid with a deep blue coloration soluble in boiling nitrobenzene with an olive coloration; dyeing cotton from the vat fast olive tinged brown shades.

2. The process which comprises causing strong sulfuric acid to act upon a compound of the probable general formula:

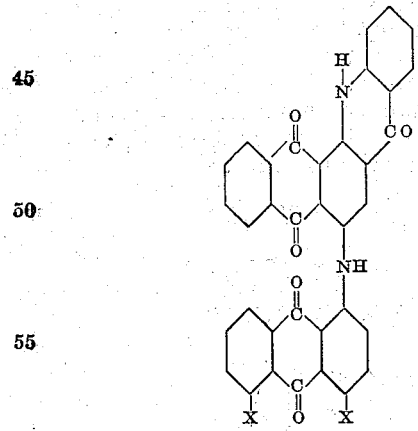

wherein X stands for hydrogen or the benzoylamino group, but at least one X being a benzoylamino group at a temperature between about 15 to about 40° C. and oxidizing the condensation product thus obtained.

3. The process which comprises causing strong sulfuric acid to act upon a compound of the probable formula:

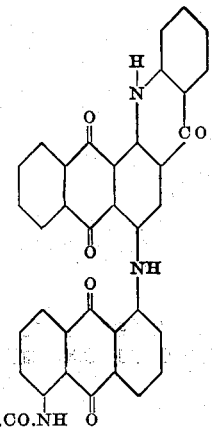

at a temperature between about 15° to about 20° C. and oxidizing the condensation product thus obtained.

4. As new products vat dyestuffs of the probable general formula:

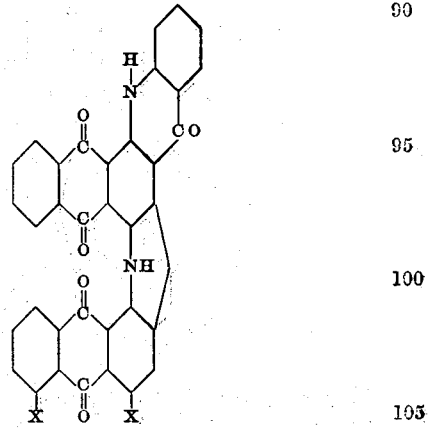

wherein X stands for hydrogen or the benzoyl-amino group, at least one X being a benzoyl-amino group, said products forming dark powders, difficulty soluble in the usual organic solvents, dyeing cotton from a yellow-brown vat olive-brown to reddish-grey shades of good fastness properties.

In testimony whereof I have hereunto set my hand.

WALTER MIEG.